United States Patent
Sprenger

(10) Patent No.: US 7,111,808 B2
(45) Date of Patent: Sep. 26, 2006

(54) ARRANGEMENT OF A SAFETY AND INFORMATION DEVICE ON AT LEAST ONE PASSENGER SEAT IN A PASSENGER CABIN OF A COMMERCIAL AIRCRAFT

(75) Inventor: Wilfried Sprenger, Buesum (DE)

(73) Assignee: Airbus Deutschland GmbH, (DE)

( * ) Notice: Subject to any disclaimer, the term of this patent is extended or adjusted under 35 U.S.C. 154(b) by 0 days.

(21) Appl. No.: 11/020,614

(22) Filed: Dec. 23, 2004

(65) Prior Publication Data

US 2005/0178910 A1   Aug. 18, 2005

(30) Foreign Application Priority Data

Dec. 27, 2003 (DE) .............................. 103 61 330

(51) Int. Cl.
*B64D 11/00* (2006.01)

(52) U.S. Cl. .............................. 244/118.5; 244/122 R; 40/589

(58) Field of Classification Search ............ 244/122 R; 362/37, 472; 40/589, 541; 297/183.7, 183.6, 297/183.8, 450.1, 188.07; 296/64, 68.1; 105/345–347; 116/205

See application file for complete search history.

(56) References Cited

U.S. PATENT DOCUMENTS

| | | | | | |
|---|---|---|---|---|---|
| 1,261,246 | A | * | 4/1918 | Lambert | 297/183.8 |
| 1,650,961 | A | * | 11/1927 | Rothman | 297/183.8 |
| 2,564,924 | A | * | 8/1951 | Patton | 297/183.7 |
| 2,887,802 | A | * | 5/1959 | Burmeister | 40/541 |
| 3,619,006 | A | * | 11/1971 | Barecki | 297/450.1 |
| 3,695,689 | A | * | 10/1972 | Barecki | 297/188.07 |
| 3,762,766 | A |   | 10/1973 | Barecki et al. | 297/217 |
| 4,029,994 | A | * | 6/1977 | Iwans | 315/323 |
| 5,347,434 | A | * | 9/1994 | Drake | 362/472 |
| 6,499,421 | B1 | * | 12/2002 | Honigsbaum | 116/205 |
| 2001/0023908 | A1 | * | 9/2001 | Romca et al. | 244/122 R |

FOREIGN PATENT DOCUMENTS

| | | |
|---|---|---|
| DE | 100 52 524 | 9/2001 |
| DE | 100 52 594 C2 | 3/2002 |
| JP | 05028333 A | 2/1993 |

* cited by examiner

*Primary Examiner*—Galen Barefoot
(74) *Attorney, Agent, or Firm*—Ostrolenk, Faber, Gerb & Soffen, LLP

(57) ABSTRACT

A safety and information device is arranged on at least one passenger seat in the passenger cabin of a commercial aircraft, wherein several passenger seats are arranged within the passenger cabin along at least one longitudinal aisle, and wherein display elements for providing the passengers with seat information are arranged on the respectively aisle seats. The arrangement should increase the safety of passengers who stand in the aisles during the flight and simultaneously improve the display of seat information for the passengers. This problem is solved in that the safety and information device also contains a handle element that is arranged on the passenger seat in the region of the upper lateral edge that faces the aisle and realized in the form of a recessed grip with a handle mounted thereon, and in that display elements for providing passengers with information are arranged on the outer side of the handle or on a recess flange that faces the aisle.

In this case, it is particularly advantageous that a combined safety and information device makes it possible to realize the safety and information functions with a single device.

10 Claims, 2 Drawing Sheets

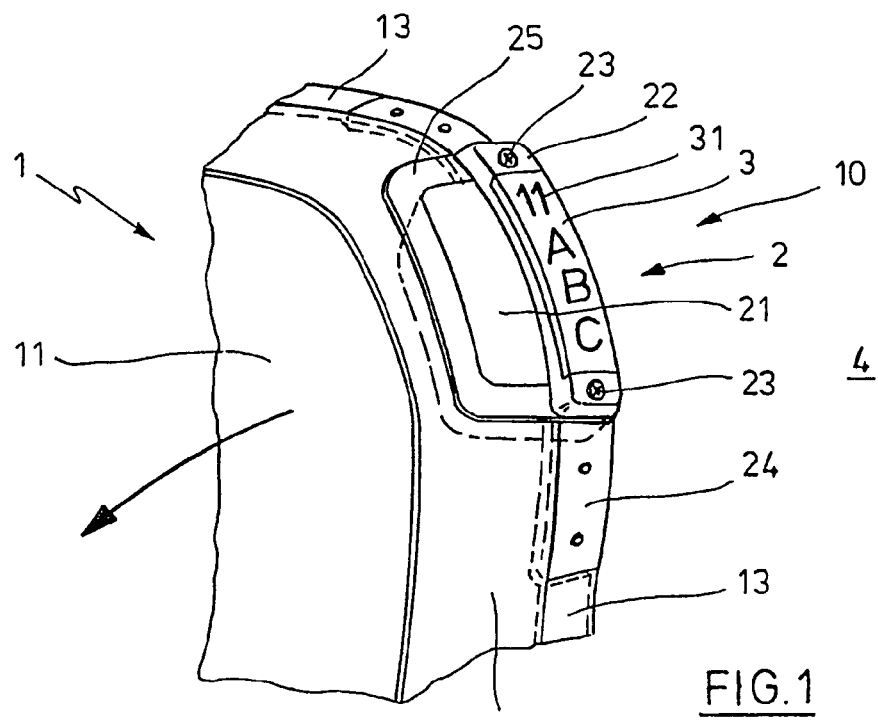
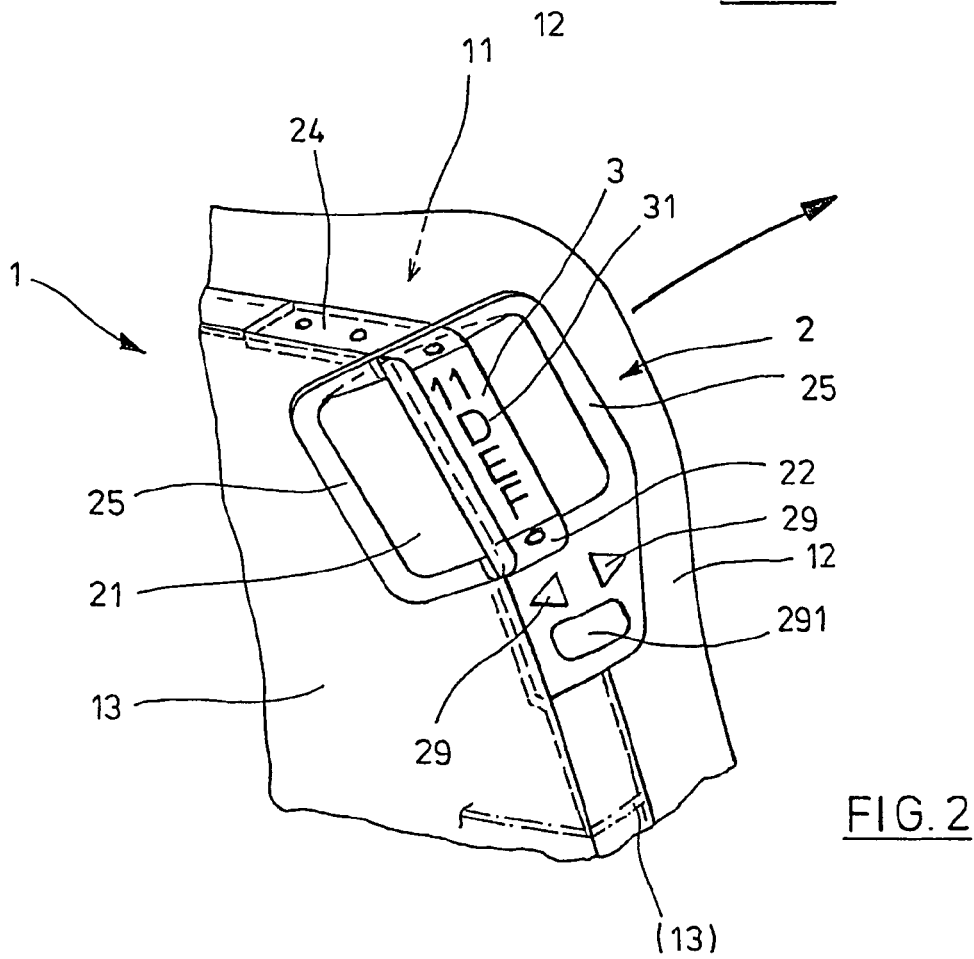

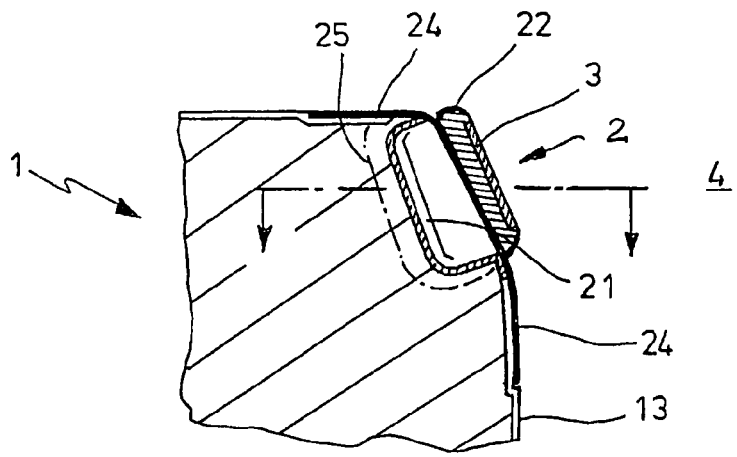
FIG. 3
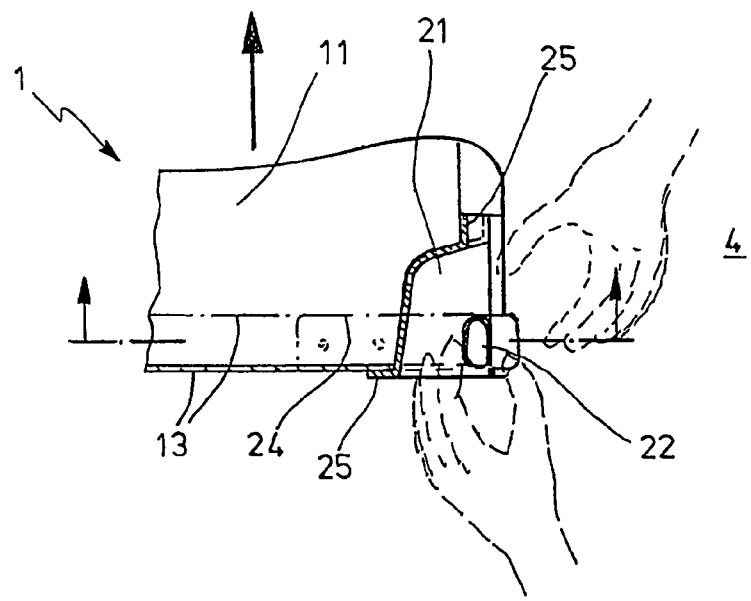
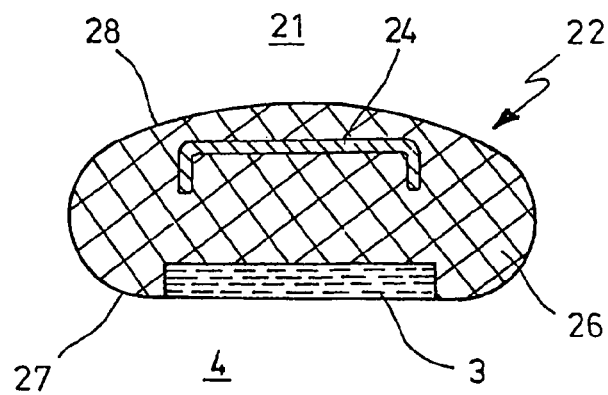
FIG. 4

ARRANGEMENT OF A SAFETY AND INFORMATION DEVICE ON AT LEAST ONE PASSENGER SEAT IN A PASSENGER CABIN OF A COMMERCIAL AIRCRAFT

FIELD OF THE INVENTION

The present invention relates to information signaling in public transport vehicles. In particular, the present invention relates to the arrangement of a safety and information device on at least one passenger seat in the passenger cabin of a commercial aircraft.

TECHNOLOGICAL BACKGROUND

In such vehicles, several passenger seats may be arranged within the passenger cabin along at least one longitudinal aisle, and display elements for displaying seat information may be arranged on the respective aisle seats.

In public transport vehicles, e.g., buses and streetcars, it is common practice to provide standing passengers with various holding elements in order to protect these passengers from falling under the influence of acceleration forces. For example, numerous transport vehicles are equipped with handles that are suspended from the ceiling or with holding rods that connect the floor or the back rest to the ceiling. Holding elements of this type are considered standard equipment in ground transport vehicles, but not provided in aircraft because a seat with a corresponding restraint (e.g., a seatbelt) is usually available for each passenger and each member of the flight crew in this case. On commercial aircraft, however, persons who are not seated in their assigned seats are at risk of becoming injured, for example, when the aircraft encounters turbulence. In addition to the flight crew, passengers may also use the aisle during the flight, for example, in order to stimulate the circulation or to use the restroom. Several passengers are frequently standing in the aisles, particularly on long-distance flights, and the aircraft may encounter an area with severe shear currents or vertical currents (so-called "clean air turbulence") without warning if it travels at a correspondingly high altitude. This is particularly hazardous for persons standing in the aisles who are not protected in such instances and subjected to the acceleration forces.

Leaving aside this safety aspect, currently utilized passenger information systems with display elements for identifying the rows of seats and the seats of the individual rows are difficult to locate for air passengers during boarding. The reason for this can be seen in the fact that conventional display elements of this type are usually positioned above the seats underneath the luggage compartment in such a way that a direct association with the corresponding seat is impossible and the passengers need to bend down in order to read the displayed information. An information system for a passenger cabin is already known from DE 100 52 594. In this case, individual display elements are conspicuously arranged on the seats in order to provide improved seat information. However, no provisions for safety means of any type are mentioned in this solution.

SUMMARY OF THE INVENTION

The invention relates to arranging a safety and information device on a passenger seat in the cabin of a commercial aircraft in such a way that not only the safety of persons standing in the aisles during the flight may be improved, but also the display of seat information for the passengers. This means that two essential functions for improving the passenger comfort may be fulfilled with low expenditures.

In this respect, it is may be advantageous that a combined safety and information device consisting of a holding structure in the form of a handle element is provided on the aisle seat, wherein the particular advantage of the invention can be seen in the combination of the safety function and the information function into a single device. This makes it possible to reduce the risk of passengers being injured should the aircraft encounter turbulence during the flight. If such safety devices in the form of handles are provided, passengers are less likely to be uncontrollably subjected to acceleration forces. The faster boarding of the aircraft achieved with the conspicuous arrangement of display elements also reduces the turnaround time. The prevention of accidents can lower the consequential costs for the airlines, and the shorter turnaround times result in more economical air traffic. This makes the arrangement of a device according to the invention in an aircraft passenger cabin even more attractive.

DETAILED DESCRIPTION OF EXEMPLARY EMBODIMENTS

In the embodiments of the invention that are illustrated in the figures, the individual elements are respectively identified by the same reference symbols in all figures. The figures show:

FIG. 1, a perspective front view of the arrangement of a safety and information device;

FIG. 2, a perspective rear view of the arrangement according to the invention;

FIG. 3, sections through a passenger seat in the form of a front view and a top view, and FIG. 4, a section through a handle according to the invention.

FIG. 1 shows the arrangement of a safety and information device 10 on at least one passenger seat 1 in the passenger cabin of a commercial aircraft, wherein several passenger seats are arranged within the passenger cabin along at least one longitudinal aisle 4. Display elements 31 for providing seat information are arranged on the aisle seats, preferably in the region of the upper edge 12 of the back rest. A holding structure in the form of a handle element 2 is arranged on the upper edge 12 of the passenger seat 1 and combined with the display elements 31. The handle element 2 consists of a recessed grip 21 and the handle 22. A display panel 3 for providing passengers with information is embedded in the handle 22. Among other things, the display elements 31 are provided for identifying the rows of seats and the individual seats. The arrow shown in the figure points in the flight direction of the aircraft such that part of the back rest upholstery 11 faces the viewer. The lateral edge 12 of the passenger seat 1 accommodates the handle element 2 in its upper section on the aisle side. This not only enables the passengers to take hold of the handle 22, but also to read the information displayed on the display panel 3. In this arrangement, the handle element 2 is situated in an optimally accessible and visible position for the passengers. Depending on the respective requirements, the handle 22 may either be installed with the aid of mounting elements 23 or the handle 22 and the recessed grip 21 form an integral unit. A moulded part 24, e.g., of flanged sheet steel or high-strength plastic is provided in order to transmit the forces acting upon the handle 22 into the back rest structure 13 of the seat 1. The moulded part 24 is directly connected to the handle 22 or realized integrally with the recessed grip 21. In one preferred embodiment, the display panel 3 utilizes electronic signals that appear in an illuminated display. The required cable connection may extend upward from the (not-shown) cabin floor of the aircraft passenger cabin along the seat. The potential options of the electronic signals can be fully utilized in this case: it is possible to realize a static display that provides seat information (row, seat), to display up-to-date instructions for the passengers (e.g., fasten seatbelts), to realize a blinking light that travels from seat to seat and indicates the emergency evacuation route, or to utilize the display elements as emergency lighting elements.

In another exemplary embodiment of the invention that is not illustrated in the figures, the display panel 3 is not embedded in the handle 22, but rather in the recess flange 25 that faces the aisle 4. In this case, the flange 25 would have to contain a corresponding widening that, however, could be easily realized. A variation of this embodiment is illustrated in FIG. 2.

FIG. 2 shows a rear view of the passenger seat 1. The handle element 2 and the passenger seat 1 with the back rest structure 13 are illustrated from the rear, with the handle element 2 being shown with a widened recess flange 25 in a second variation. The recess flange 25 can be installed on the back rest structure 13 by means of mounting elements or bonding in order to realize a durable installation of the recessed grip 21. Optionally, the recessed grip 21 and the back rest structure 13 may form an integral structure in the form of, e.g., a moulded part. In the figure, the back rest structure 13 is provided with a flange (illustrated with dot-dash lines), with this flange ensuring that the forces exerted upon the handle element are transmitted into the seat structure together with the moulded part 24 and the handle 22. With respect to this transmission of forces, it would naturally also be possible to utilize different solutions, e.g., the above-mentioned integral design of the back rest structure 13. In FIG. 2, the recess flange 25 is widened in the lower region in order to accommodate additional display elements. These additional display elements consist, for example, of blinking lights 29 that indicate the route to the closest fuselage opening in case of emergency. It would also be conceivable to provide elements 291 that serve for realizing an emergency/escape route lighting arrangement.

FIG. 3 shows sections through the device according to the invention in the form of a front view and a top view. The front view shows that the handle element 2 does not form any obstruction of the free aisle cross section in the region of the aisle 4 because the handle contour is largely adapted to the seat edge. The top view shows that the recessed grip 21 and the handle 22, respectively, can be easily accessed (hand illustrated with dotted lines). The arrow points in the flight direction of the aircraft. The top view also elucidates the advantageous option of realizing the back rest structure 13 and the recessed grip 21 in the form of an integral moulded part as mentioned above in the description of FIG. 2.

FIG. 4 shows a section through the handle 22. The outer side 27 that faces the aisle 4 is realized flat or in a slightly curved fashion in order to accommodate the display panel 3. The inner side 28 of the handle, in contrast, has an ergonomically curved contour. In order to achieve an adequate hold, the invention also proposes to manufacture the handle 22 from a compatible plastic material 26 for handles that has a slight elasticity. A moulded part (e.g., a flanged steel sheet) 24 is provided, if so required, in the interior of the handle 22 in order to transmit the forces exerted upon the handle 22 into the back rest structure 13. The moulded part 24 may also be omitted if the handle components 21 and 22 have a corresponding rigidity.

It should be noted that the term "comprising" does not exclude other elements or steps and the "a" or "an" does not exclude a plurality. Also elements described in association with different embodiments may be combined.

It should also be noted that reference signs in the claims shall not be construed as limiting the scope of the claims.

LIST OF REFERENCE SYMBOLS

1 Passenger seat
   10 Safety and information device
   11 Back rest upholstery
   12 Lateral edge/seat edge
   13 (Seat) back rest structure 2 Handle element
   21 Recessed grip
   22 Handle
   23 Mounting element
   24 Moulded part
   25 Recess flange
   26 Plastic material
   27 Outer side of handle
   28 Inner side of handle
   29 Blinking light
   291 Emergency lighting 3 Display panel
   31 Display elements 4 Aisle

What is claimed is:

1. An arrangement of a safety and information device on at least one passenger seat in a passenger cabin of a commercial aircraft, wherein a plurality of passenger seats are arranged within the passenger cabin along at least one longitudinal aisle, wherein the safety and information device comprises:
the at least one passenger seat having an upper lateral edge that faces the aisle,
a handle element arranged on the passenger seat in a region of the upper lateral edge of the passenger seat that faces the aisle;
wherein the handle element has the form of a recessed grip recessed into the lateral edge and with a handle mounted thereon and the handle element extends vertically along the lateral edge of the passenger seat that faces the aisle; and
at least one display element configured to provide passengers with information and which are is arranged on at least one of an outer side of the handle and on a recess flange that faces the aisle.

2. The arrangement of claim 1, wherein the at least one display element is arranged on a display panel, with the display panel being mounted on at least one of the outer side of the handle and the recess flange that faces the aisle.

3. The arrangement of claim 1, wherein the handle is detachably connected to the recessed grip by means of mounting elements.

4. The arrangement of claim 1, wherein the handle and the recessed grip are one integral component.

5. The arrangement of claim 1, wherein a stable moulded part that originates at one of the recessed grip and the handle is functionally connected to a back rest structure of the passenger seat.

6. The arrangement of claim 1, wherein a recess flange of the recessed grip is functionally connected to a back rest structure of the passenger seat.

7. The arrangement of claim 1, wherein the recessed grip forms an integral component of a back rest structure.

8. The arrangement of claim 1,
   wherein the outer side of the handle is flat and the handle has an inner side which is ergonomically rounded; and
   wherein the handle comprises a compatible plastic material for handles.

9. The arrangement of claim 1,
   wherein the display panel comprises an illuminated display for displaying a row indication and a seat indication and other information including at least one of up-to-date instructions and warnings for the passengers and a blinking light that travels from seat to seat and provides directional information regarding an escape route in case of emergency.

10. The arrangement of claim 1, wherein the recess flange contains a surface for accommodating display elements including blinking lights or emergency lighting elements.

* * * * *